Figure 1:
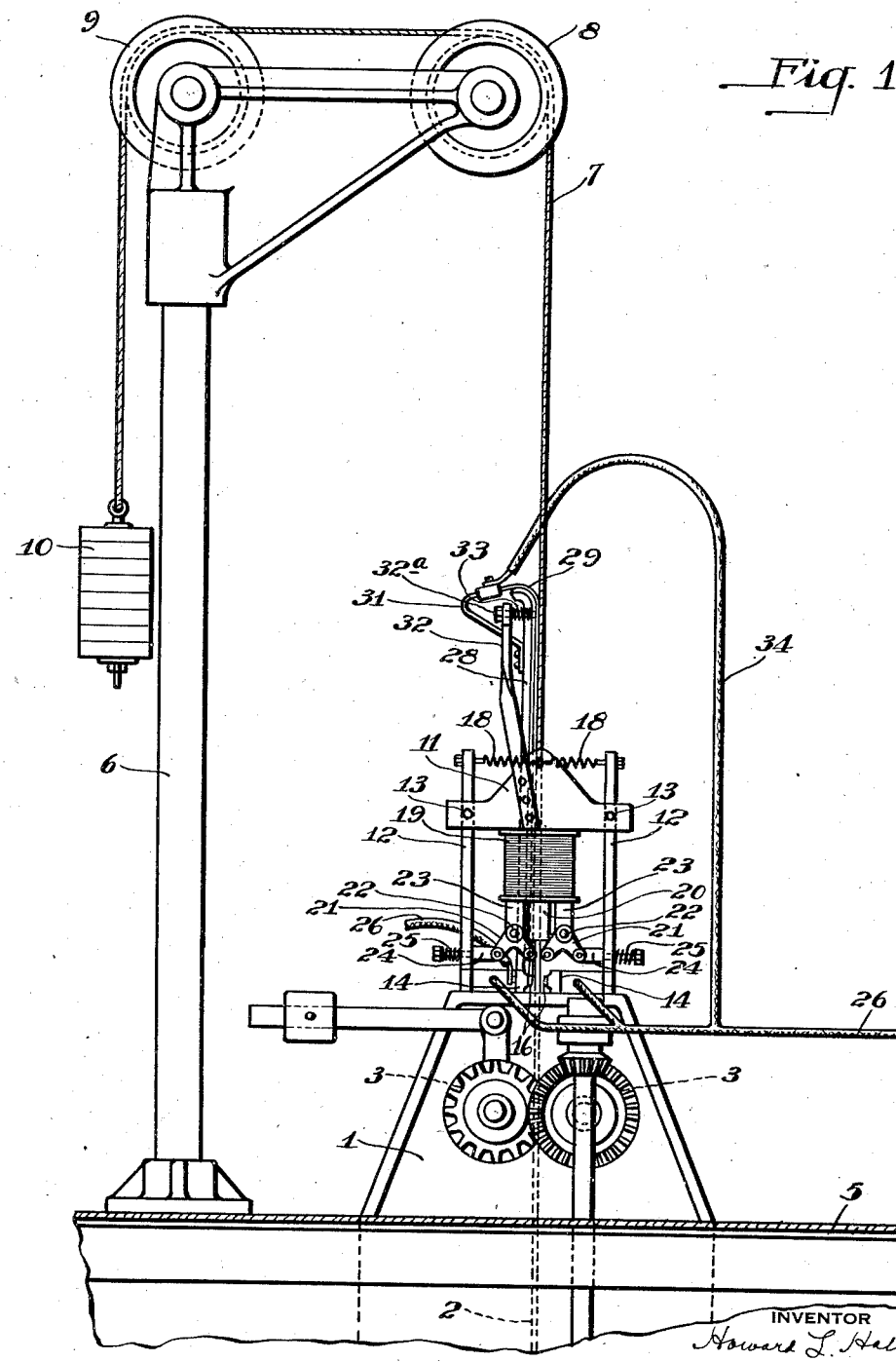

Jan. 21, 1930. H. L. HALBACH 1,744,045
PROCESS AND APPARATUS FOR SEVERING GLASS SHEETS
Filed Feb. 1, 1928 4 Sheets-Sheet 1

INVENTOR
Howard L. Halbach
by
James C. Bradley
Atty

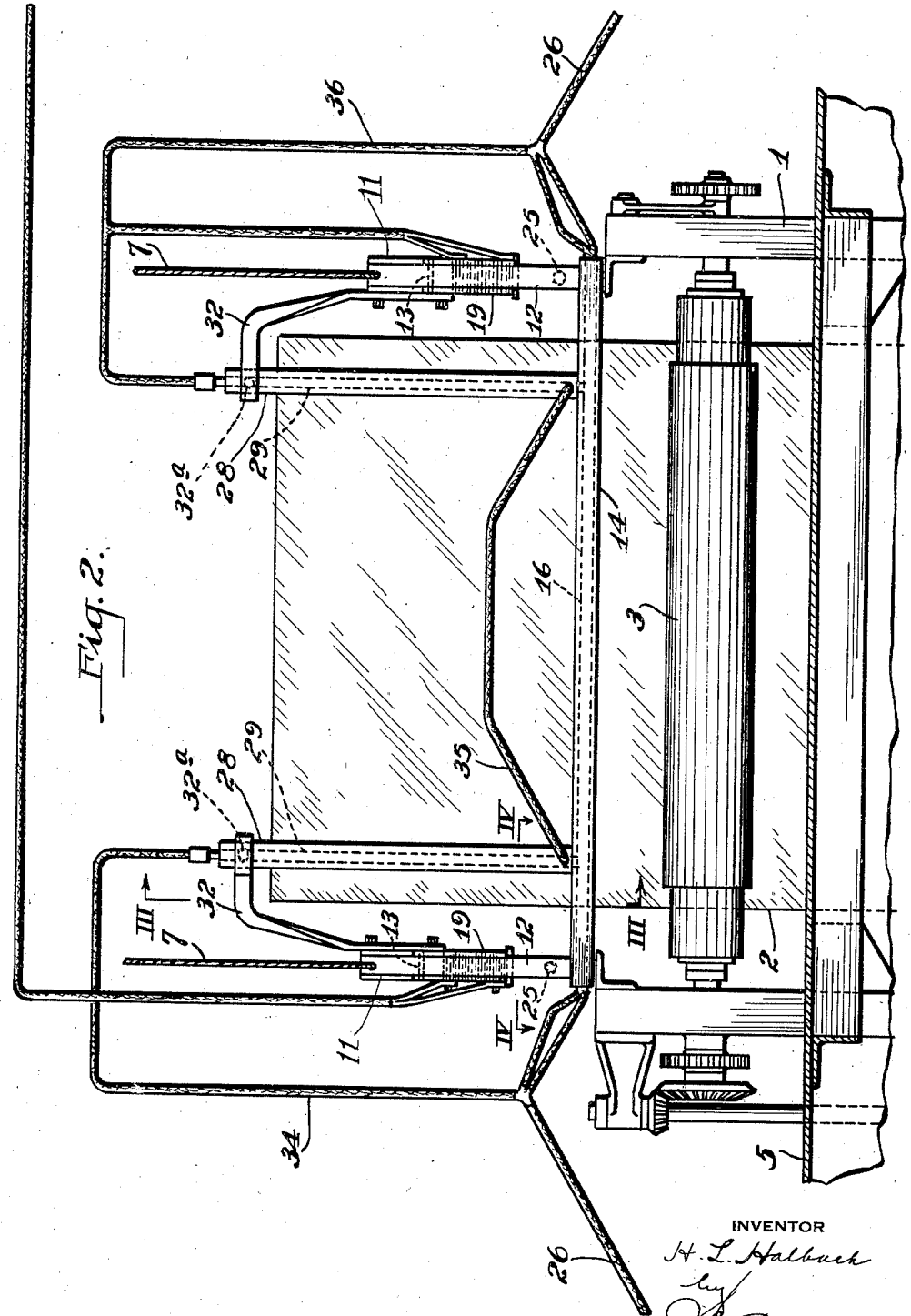

Jan. 21, 1930. H. L. HALBACH 1,744,045
PROCESS AND APPARATUS FOR SEVERING GLASS SHEETS
Filed Feb. 1, 1928  4 Sheets-Sheet 3
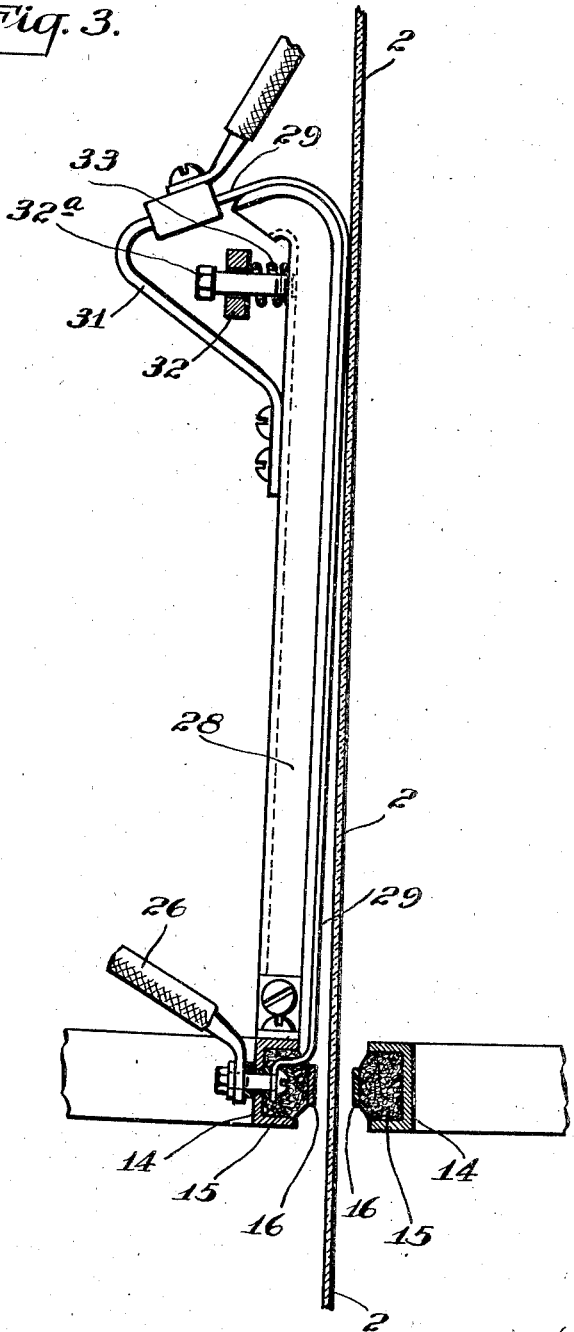
INVENTOR
Howard L. Halbach
by
James C. Bradley
atty

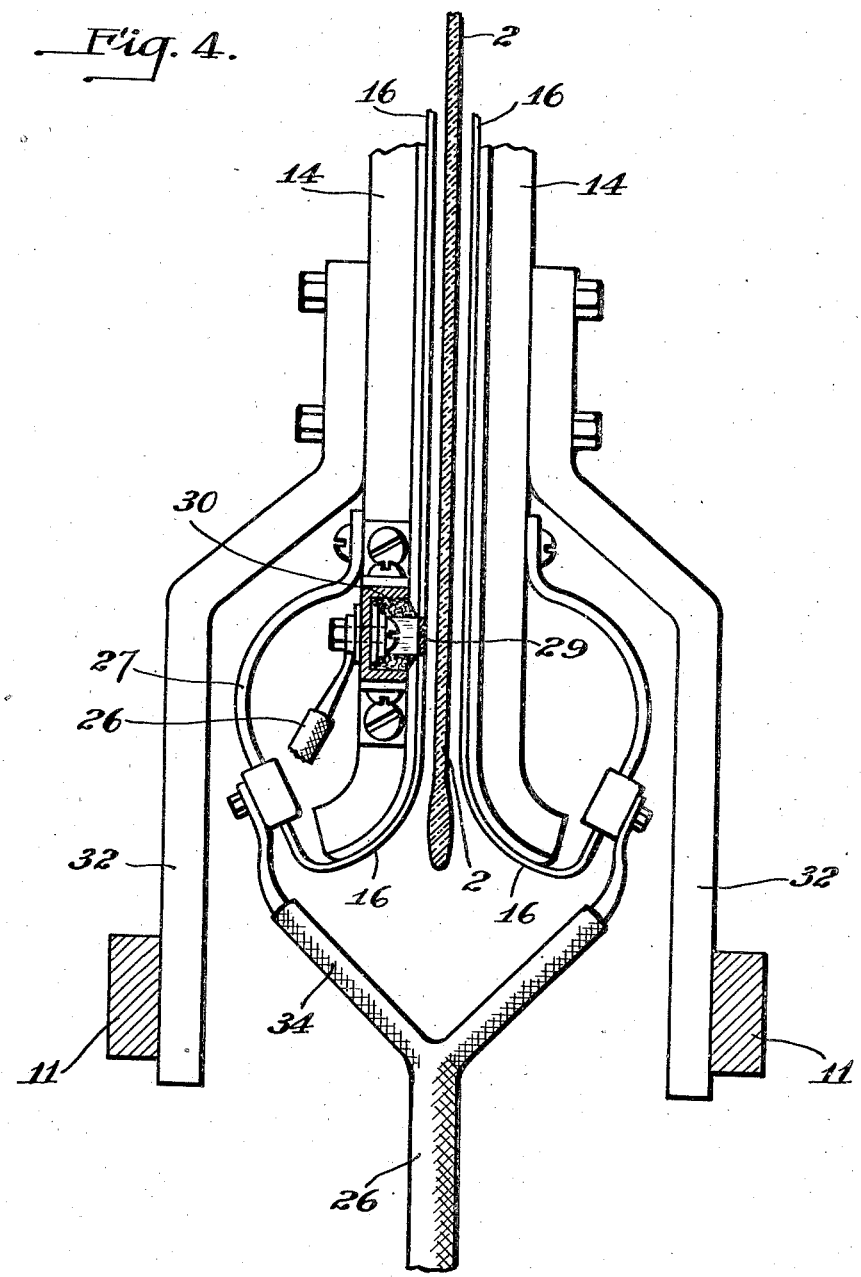

Patented Jan. 21, 1930

1,744,045

UNITED STATES PATENT OFFICE

HOWARD L. HALBACH, OF CLARKSBURG, WEST VIRGINIA, ASSIGNOR TO PITTSBURGH PLATE GLASS COMPANY, A CORPORATION OF PENNSYLVANIA

PROCESS AND APPARATUS FOR SEVERING GLASS SHEETS

Application filed February 1, 1928. Serial No. 251,146.

The invention relates to a process and apparatus for severing the edges of a continuously formed glass sheet or ribbon. The invention is designed particularly for use with the severing apparatus shown in the Slingluff Patent No. 1,373,533, although not necessarily limited to use with this particular apparatus. After the glass sheets are severed from the glass ribbon, it is necessary to trim off the edges which are not as well tempered as the body of the sheet, and are ordinarily somewhat thicker. This has heretofore been done (in the vertical drawing process) by means of a diamond, as soon as the sheets are removed from the machines, the straightness of the cut being dependent upon the skill of the operator, and the distance in from the edge, at which the cut is made, being dependent on the judgment of the operator. As a result, there is a considerable waste of glass, due to lack of straightness of the cuts and due to the operator cutting too close or too far from the edge of the sheet. The present invention is designed (1) to lessen the work of the operator; (2) to insure cuts which are perfectly straight; and (3) to provide for a uniform width of trimming, so that just the right amount of glass is trimmed off, and all the finished sheets are made the same width. Briefly stated, these results are accomplished by the use of a pair of electrically heated elements, of about the same length as the sheet to be cut off, extending longitudinally of the sheet closely adjacent the edges. These elements are carried by one of the transverse clamping members, which carry the transverse heating elements. When these clamping elements are caused to engage the glass (as in the Slingluff patent referred to) and move along therewith, the edge heating elements are also caused to engage the sheet adjacent its edges; and after the sheet has been cracked off and set down, the operator applies a cold tool to one end of each of the heated lines causing the glass edges to crack off along such lines. One embodiment of the apparatus employed is shown in the accompanying drawings, wherein:

Figure 1 is a side elevation of the apparatus in connection with the upper end of the glass drawing machine. Fig. 2 is a front view. And Figs. 3 and 4 are sections respectively on the lines III—III and IV—IV of Fig. 2.

Referring to the general arrangement, as shown in Figs. 1 and 2, the numeral 1 represents the upper end of an annealing leer of the Fourcault type through which the glass ribbon 2 is being continuously drawn by means of rolls located in the leer, only one pair of such rolls 3, 3 being shown in the drawings. Carried by the floor 5 are the pillars 6 from which the electrical capping off apparatus is supported. This apparatus is carried by a pair of cables 7 passing over the pulleys 8, 9 and provided at their ends with the counterweights 10, these weights being only sufficient to partially counterbalance the weight of the apparatus carried by the other ends of the cables. Supported upon the ends of the cables are the frame members 11, 11 carrying the levers 12, 12 pivoted to the frame members at 13, 13. These levers carry at their lower ends the transverse bars 14, 14, preferably of U-shape in cross section, as indicated in Fig. 3.

The bars 14, 14 carry upon their inner sides the strips of asbestos 15, 15 and this in turn supports the ribbons 16, 16, preferably of nickel chromium in order to give the necessary heat resisting qualities. The bars are normally held away from the glass sheet 2, which passes upward therebetween by means of the tension springs 18, 18 connected at the outer ends to the upper ends of the levers 12, 12 and at their inner ends to the frame members 11. Also carried by the frame members 11, 11 are the solenoid coils 19, 19, provided with the vertically movable bars 20, 20, which are adapted to be drawn up into the coils when current is passed through such coils. The solenoid bars are pivoted at their lower ends to the bell crank levers 21, 21, such levers being fulcrumed at 22, 22 to the brackets 23, 23, depending from the frame members 11, 11. The outer ends of the bell crank levers are pivoted to the brackets 24, 24, which have stems projecting through the levers 12, 12 and held yieldingly against the levers by means of the springs 25, 25. When current is passed through the coils 11, 11, the bell crank levers 21, 21 are moved around their fulcrums, swinging the lower ends of the levers 12, 12 inward and causing the nichrome ribbons carried by the bars 14, 14 to engage the sides of the glass sheet 2. When the flow of current through the coils 19, 19 is interrupted, the springs 18, 18 move the lower ends of the levers 12, 12 outward, thus bringing the bars 14, 14 to the position shown in Fig. 3. Current is supplied through the ribbons 16, 16 by means of the leads 26, 26 connected to the ends of such ribbons as indicated in detail in Fig. 4. The ribbons 16, 16 are maintained under tension to keep them straight by means of the spring members 27, 27.

Mounted upon one of the bars 14 and projecting upwardly therefrom are the bars 28, 28 which carry the electrically heated ribbons 29, 29 for heating the glass along lines parallel to its edges. The bars 28, 28 are preferably similar in cross section to the bars 14, 14, as is indicated in Fig. 4, such bars carrying asbestos strips 30 against which the nichrome ribbons 29, 29 rest. These ribbons are held tight by means of the spring members 31, 31 corresponding to the members 27, 27, heretofore referred to. The upper ends of the bars 28, 28 are also supported from the frame members by means of the brackets 32, 32, the connection between these brackets and the bars 28, 28 being secured by means of the stud bolts 32ª, 32ª encircled by the spring 33, 33, which method of connection serves to keep the upper ends of the bars 28, 28 yieldingly pressed into engagement with the glass sheet 2. Current is supplied through the two vertical ribbons 29, 29 via the connections 34, 35 and 36, the connections 34 and 36 being secured at their ends to the leads 26, 26, as indicated in Fig. 2. The bars 28, 28 are preferably of approximately the same length as the glass sheet which is to be cut off.

In operation the glass sheet moves upward until the proper length to be cut off lies above the bars 14, 14. Current is then caused to flow through the two solenoids 19, 19, so that their bars 20, 20 are moved upward, causing the bars 14, 14 to move in and clamp the glass sheet therebetween. At the same time, current is supplied through the leads 26, 26 so that the two transverse ribbons 16, 16 are heated and also the two vertical ribbons 29, 29. The parts remain in this position until the glass is sufficiently heated to be cracked off, the apparatus carrying the four ribbons being moved upward by the glass during this period and the counterweights 10, 10 at such time removing from the glass sheet the major portion of the work incident to lifting the severing apparatus. When the glass has been sufficiently heated for the cracking off function, the flow of current through the solenoids is discontinued and also the flow of current through the leads 26, 26 and at the same time, the operator applies a cool tool, preferably a rod which is slightly wet, against the sheet near one edge at the line heated by the ribbons 16, 16, the other operator at this time grasping the upper edge of the sheet and supporting it so that it will not fall when it has been cracked off. The sheet immediately cracks off along the line heated by the ribbon 16, 16 and the operator who is holding such sheet by its upper edge carries it away a short distance and deposits it in vertical position upon a rack. Immediately thereafter he applies a cracking off tool, preferably an iron rod wet at its end, at some point along the lines at which the glass has been heated by the vertical ribbons 29, 29, thus causing the edges to crack off along these lines.

This completes the cycle of operation and the operator, after placing the glass sheet which has been trimmed in a suitable rack, returns to position adjacent the cracking off apparatus preparatory to taking care of the next sheet of glass which is severed from the continuous ribbon. As soon as the glass sheet is cracked off by the ribbons 16, 16, the cracking off apparatus, including the frame members 11, 11 and the parts carried thereby, returns of its own weight to starting position, as shown in Figs. 1 and 2. As indicated in Fig. 3, the upright bars 28, 28 which carry the vertical cracking off ribbons are preferably inclined toward the glass sheet at their upper ends so that the ribbons touch the sheet at the upper ends of the bars. When the lower ends of the bars 28, 28 are, therefore, moved inward by the bar 14, the vertical ribbons 29, 29 are caused to engage the sheet throughout their length.

What I claim is:

1. Apparatus for separating the edge of an upwardly moving sheet of glass, which comprises a clamping member extending transversely of the sheet and free to move with the sheet, a heating element extending longitudinally of the clamping member, a second heating element extending longitudinally of the sheet adjacent the edge thereof and supported at its lower end upon said clamping member, means for intermittently clamping said member against the glass so that it moves along with the glass, spring means holding the upper end of the second heating element in advance of its lower end and in advance of the first mentioned heating element, and means for causing a flow of electric current through both of said elements to heat them.

2. A process of severing the edges of a continuously formed glass ribbon, which consists in heating the glass along lines adjacent its edges for a distance corresponding to the length of the glass sheet to be severed from the ribbon just before such sheet is severed, severing the sheet from the ribbon, removing the sheet from its position at the end of the ribbon, and then applying cooling means to the heated lines along the edges of the sheet to cause the edges to crack off along said lines.

In testimony whereof, I have hereunto subscribed my name this 27th day of January, 1928.

H. L. HALBACH.